United States Patent
Tokumoto

(10) Patent No.: US 10,952,056 B2
(45) Date of Patent: Mar. 16, 2021

(54) MOBILE TERMINAL, INFORMATION PROCESSING METHOD AND PROGRAM

(71) Applicant: CANON KABUSHIKI KAISHA, Tokyo (JP)

(72) Inventor: Hirokazu Tokumoto, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/283,945

(22) Filed: Feb. 25, 2019

(65) Prior Publication Data
US 2019/0191286 A1    Jun. 20, 2019

Related U.S. Application Data

(63) Continuation of application No. 15/979,875, filed on May 15, 2018, now Pat. No. 10,257,683.

(30) Foreign Application Priority Data

May 18, 2017  (JP) .............................. JP2017-099016

(51) Int. Cl.
*H04W 4/80*        (2018.01)
*H04B 17/318*    (2015.01)
(Continued)

(52) U.S. Cl.
CPC .............. *H04W 4/80* (2018.02); *H04B 17/21* (2015.01); *H04B 17/23* (2015.01); *H04B 17/318* (2015.01);
(Continued)

(58) Field of Classification Search
CPC ....... H04W 4/80; H04W 12/00; H04W 4/021; H04W 4/029; H04W 4/024; H04W 4/20;
(Continued)

(56) References Cited

U.S. PATENT DOCUMENTS 10,257,683 B2 *  4/2019  Tokumoto ............... H04W 4/80
2010/0033512 A1  2/2010  Kito
(Continued)

FOREIGN PATENT DOCUMENTS

JP        2013153271 A    8/2013

OTHER PUBLICATIONS

Notice of Allowance issued in U.S. Appl. No. 15/979,875 dated Nov. 29, 2018.

*Primary Examiner* — Diane D Mizrahi
(74) *Attorney, Agent, or Firm* — Rossi, Kimms & McDowell LLP

(57) ABSTRACT

A method of correcting a radio wave strength of a packet received by a communication terminal is disclosed, comprising: displaying a first screen related to the correction of the radio wave strength of the received packet; acquiring first information indicating the radio wave strength of the received packet, according to acceptance of a predetermined user instruction via the first screen; displaying a second screen related to the correction of the radio wave strength of the received packet, at least according to completion of the acquisition; acquiring second information indicating the radio wave strength of the received packet, according to acceptance of a predetermined user operation via the second screen; and deciding a correction value at least based on the acquired first and second information. Thus, it is possible to accurately perform proximity determination of determining that a mobile terminal and an information processing apparatus are within a certain distance.

12 Claims, 9 Drawing Sheets

(51) Int. Cl.
   *H04B 17/21* (2015.01)
   *H04B 17/23* (2015.01)
   *H04W 12/00* (2009.01)
   *H04W 12/06* (2009.01)

(52) U.S. Cl.
   CPC . *H04W 12/00503* (2019.01); *H04W 12/0608* (2019.01)

(58) Field of Classification Search
   CPC ........... H04W 4/21; H04W 4/70; H04W 4/02; H04W 12/06; H04W 12/02; H04W 12/04; H04B 17/20; H04B 17/318
   See application file for complete search history.

(56) References Cited

U.S. PATENT DOCUMENTS

| | | | |
|---|---|---|---|
| 2014/0171107 A1 | 6/2014 | Kao et al. | |
| 2015/0373749 A1* | 12/2015 | Palin | H04W 76/10 455/41.2 |
| 2019/0124473 A1* | 4/2019 | Yoshida | G06F 3/1236 |
| 2019/0334619 A1* | 10/2019 | Aoyama | G06F 3/0481 |

* cited by examiner

FIG. 7A

|  | RSSI MEASURED VALUE (IMMIDIATE) | RSSI MEASURED VALUE (0cm) | RSSI ESTIMATED VALUE (5cm) | RSSI ESTIMATED VALUE (10cm) |
|---|---|---|---|---|
| MFP 101 | -24 | -18 | -21 | - |
| MFP 110 | -51 | -12 | - | -35 |

MEASURED VALUE AND ESTIMATED VALUE OF
RADIO WAVE STRENGTH AT EACH DISTANCE

FIG. 7B

|  | RSSI THRESHOLD (IMMIDIATE) | RSSI THRESHOLD (TouchLike) |
|---|---|---|
| MFP 101 | -24 | -21 |
| MFP 110 | -51 | -35 |

IMMIDIATE AND TouchLike
DETERMINATION THRESHOLDS

MOBILE TERMINAL, INFORMATION PROCESSING METHOD AND PROGRAM

BACKGROUND OF THE INVENTION

Field of the Invention

The present invention relates to a mobile terminal, an information processing method, and a program for realizing the information processing method.

Description of the Related Art

In recent years, more information processing apparatuses such as a multifunction machine, a printer and the like which are equipped with wireless functions such as a wireless LAN (local area network), a Bluetooth® LE (Low Energy) and the like are increasing.

A user performs wireless communication with the information processing apparatus by using a mobile terminal, performs pairing between the mobile terminal and the information processing apparatus based on information included in communication information, and then performs various processes such as a login process, a printing process and the like.

Incidentally, since a radio wave strength in wireless communication generally has a property of attenuating in inverse proportion to the square of a distance, the distance between the mobile terminal and the information processing apparatus can be estimated from the radio wave strength received by the mobile terminal. From a viewpoint of security, there is a technique of performing proximity determination according to the radio wave strength of the information processing apparatus received by the mobile terminal, and controlling to enable to perform the process of the information processing apparatus according to a determination result that the portable terminal and the information processing apparatus are in close proximity to each other. With the technique like this, for example, a process of logging in from the mobile terminal to the information processing apparatus as a specific user, and a process of flowing or entering information from the mobile terminal into the image forming apparatus are performed after the proximity determination.

For example, Japanese Patent Application Laid-Open No. 2013-153271 discloses, as a related background art, a technique of determining, in the mobile terminal, whether or not the distance to the information processing apparatus is in close proximity. In Japanese Patent Application Laid-Open No. 2013-153271, in order to accurately determine the proximity to the information processing apparatus capable of performing wireless communication, a threshold to be used for the proximity determination in a state of a certain distance from the information processing apparatus is generated and stored, and the proximity determination is performed by using the generated and stored threshold.

SUMMARY OF THE INVENTION

According to one aspect of the present invention, there is provided a method of correcting a radio wave strength of a packet received by a communication terminal, the method comprising: displaying a first screen related to the correction of the radio wave strength of the received packet; acquiring first information indicating the radio wave strength of the packet received by the communication terminal, in accordance with acceptance of a predetermined user instruction via the first screen; displaying a second screen related to the correction of the radio wave strength of the received packet, at least in accordance with completion of the acquisition; acquiring second information indicating the radio wave strength of the packet received by the communication terminal, in accordance with acceptance of a predetermined user operation via the second screen; and deciding a correction value at least based on the acquired first information and the acquired second information.

According to the present invention, it is possible to more accurately perform proximity determination.

Further features of the present invention will become apparent from the following description of exemplary embodiments with reference to the attached drawings.

BRIEF DESCRIPTION OF THE DRAWINGS

FIGS. 7A and 7B are diagrams for illustrating examples of a table.

DESCRIPTION OF THE EMBODIMENTS

Hereinafter, preferred embodiments of the present invention will be described in detail in accordance with the accompanying drawings. In the following embodiments, there will be described a mechanism by which a correcting process for a threshold to be used in proximity determination is performed using radio wave strengths measured at a plurality of points, while taking into consideration that an attenuation rate of the radio wave strength based on a distance greatly varies depending on a measuring environment.

First Embodiment (System Configuration)

Figure 1:
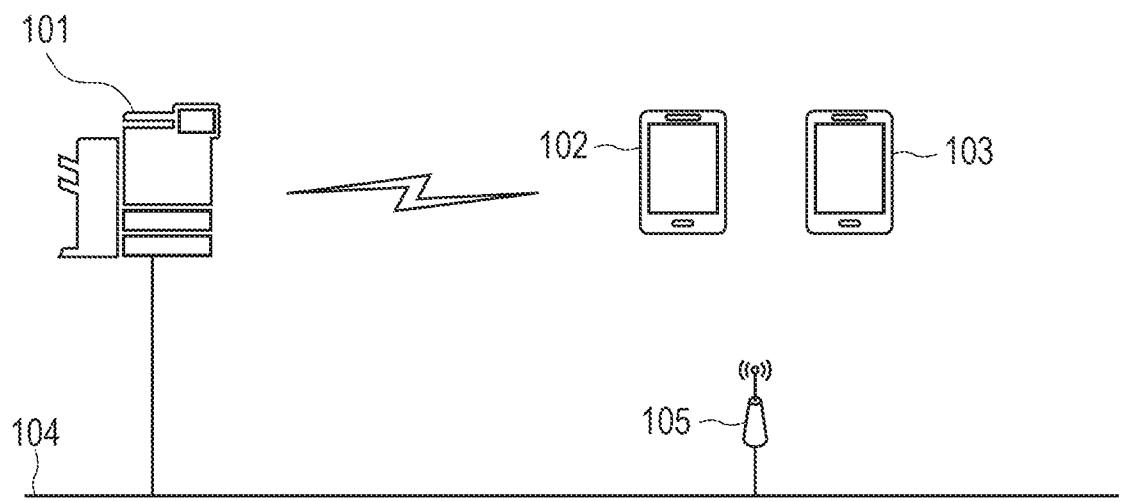
FIG. 1 is a diagram for schematically illustrating a system configuration of a communicating system.

FIG. 1 is a diagram for schematically illustrating a system configuration of a communicating system. In an environment according to the present embodiment, there are one or more MFPs (multifunction Peripherals) and a plurality of mobile terminals. For example, it is assumed that the communicating system of the present embodiment is implemented in an office environment such that each person possesses a single mobile terminal and regularly carries it. The MFP is installed in the office environment. Each of an MFP 101, a mobile terminal 102 and a mobile terminal 103 illustrated in FIG. 1 is an example of the apparatus/device constituting the communicating system. The mobile terminals 102 and 103 are owned respectively by different users. The MFP 101 is connected to a network LAN (local area network) 104, and can mutually communicate with other terminals connected to the LAN 104. Similarly, the mobile terminal 102 and the mobile terminal 103 can be connected to the LAN 104 via a wireless router 105, and can mutually communicate with other terminals connected to the LAN 104. Besides, each of the MFP 101, the mobile terminal 102 and the mobile terminal 103 has a Bluetooth® communication function, and can mutually connect and communicate with others within a range within which a radio wave of Bluetooth® can reach. Although only one MFP is shown in an example of the communicating system of FIG. 1, a plurality of MFPs may be included in the communicating system. Similarly, although only two mobile terminals are shown in the example of the communicating system of FIG. 1, two or more mobile terminals may be included in the communicating system. The mobile terminal 102 includes, for example, a communication terminal such as a smartphone, a tablet PC (personal computer) or the like that a user can carry. The MFP is an example of an information processing apparatus. Incidentally, it should be noted that the mobile terminal and the image forming apparatus of the present embodiment are not limited to those described above. For example, the mobile terminal may be a wearable terminal which is typified by a smart watch or the like. Besides, for example, the information processing apparatus may be a device which can perform communication with the mobile terminal by wireless communication such as the Bluetooth® communication. More specifically, the information processing apparatus may be a device such as a PC, a camera, a projector, a headphone, a refrigerator, a television set, an audio assistant terminal, or the like. Also, the present embodiment can be applied to a case where proximity determination is made between the two mobile terminals. As just described, the present embodiment can be applied to the case where proximity determination between the apparatuses/devices is performed by the wireless communication such as the Bluetooth® communication or the like.

(Hardware Constitution)

Figure 2:
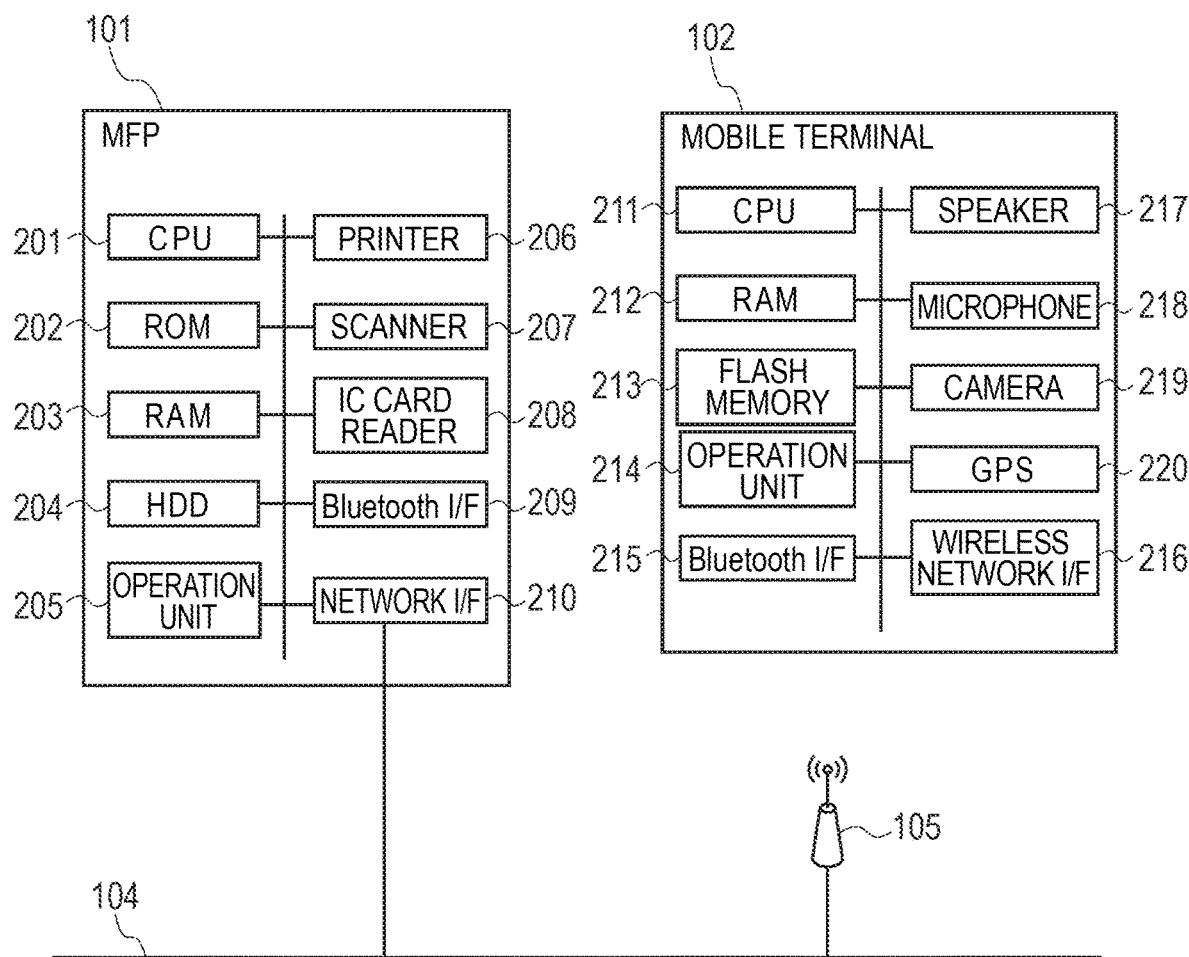
FIG. 2 is a diagram for illustrating an example of hardware constitutions of apparatuses/devices included in the communicating system.

FIG. 2 is a diagram for illustrating an example of hardware constitutions of apparatuses/devices included in the communicating system.

As the hardware constitution of the MFP 101, a CPU (central processing unit) 201 controls entire operations of the MFP 101. The CPU 201 reads a control program stored in a ROM (read only memory) 202, and performs various kinds of control such as reading control, transmission control and the like. A RAM (random access memory) 203 is a volatile memory to be used as a working area or the like for the CPU 201 to execute various programs. An HDD (hard disk drive) 204 stores therein image data and various programs. An operation unit 205 includes a display which operates as a touch panel capable of being operated by a user's finger. A printer 206 prints the image data transferred via an internal bus on paper. A scanner 207 reads an image on an original document, and generates image data of the read image. An IC (integrated circuit) card reader 208 reads an IC card to be used for user authentication. A Bluetooth® I/F (interface) 209 is an interface which performs wireless communication by the Bluetooth® standard, and communicates with another device having a Bluetooth® I/F. In the present embodiment, the mobile terminal and the MFP communicate with each other by the Bluetooth® standard. A network I/F 210 is an NIC (network interface card) for connecting to a network. The hardware units 201 to 210 are connected via an internal bus, and can mutually exchange various data. On the premise that the CPU 201 performs processes based on the programs stored in the ROM 202 or the HDD 204, software configuration of the MFP 101 in later-described FIG. 3A and the like are realized.

Subsequently, the hardware constitution of the mobile terminal 102 will be described. A CPU 211 controls entire operations of the mobile terminal. A RAM 212 is a volatile memory to be used as a working area or the like for the CPU 211 to execute various programs. A flash memory 213 is a nonvolatile memory which stores therein various programs and data. An operation unit 214 includes a display which operates as a touch panel capable of being operated by a user's finger. A Bluetooth® I/F 215 is an interface which performs communication by the Bluetooth® standard, and communicates with another device having a Bluetooth® I/F. In the present embodiment, the mobile terminal communicates with the MFP by Bluetooth® standard. A wireless network I/F 216 is a wireless-compliant NIC which can perform network communication by connecting with the wireless router 105. A speaker 217 is a device which converts a sound electronic signal into a sound. A microphone 218 detects sound, and converts the detected sound into an electronic signal. A camera 219 captures (or photographs) a still image and a moving image, and converts them into electronic data. The GPS (global positioning system) 220 is a GPS receiver.

Figure 6:
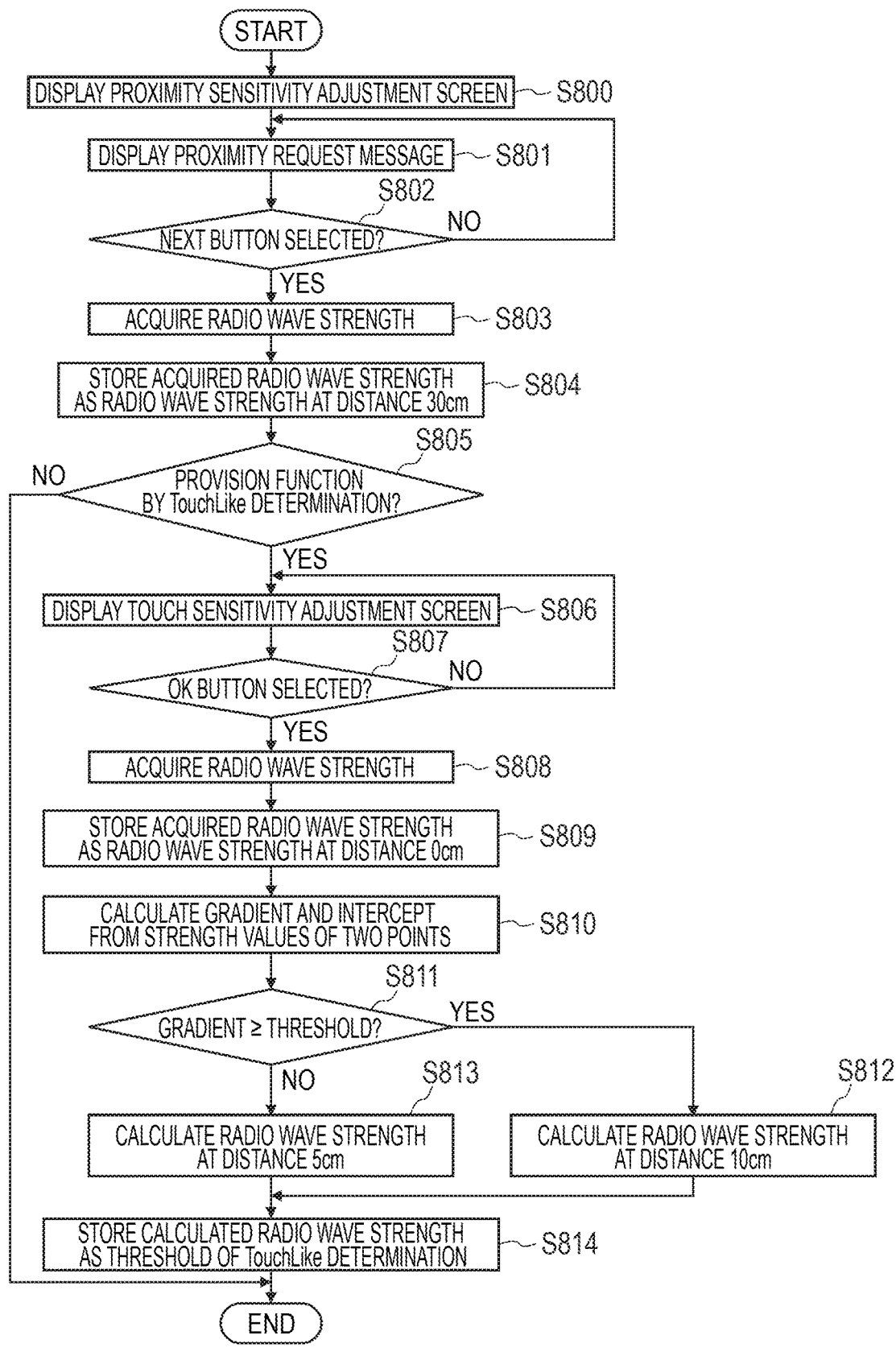
FIG. 6 is a flow chart for describing an example of an information process of performing sensitivity adjustment.
Figure 9:
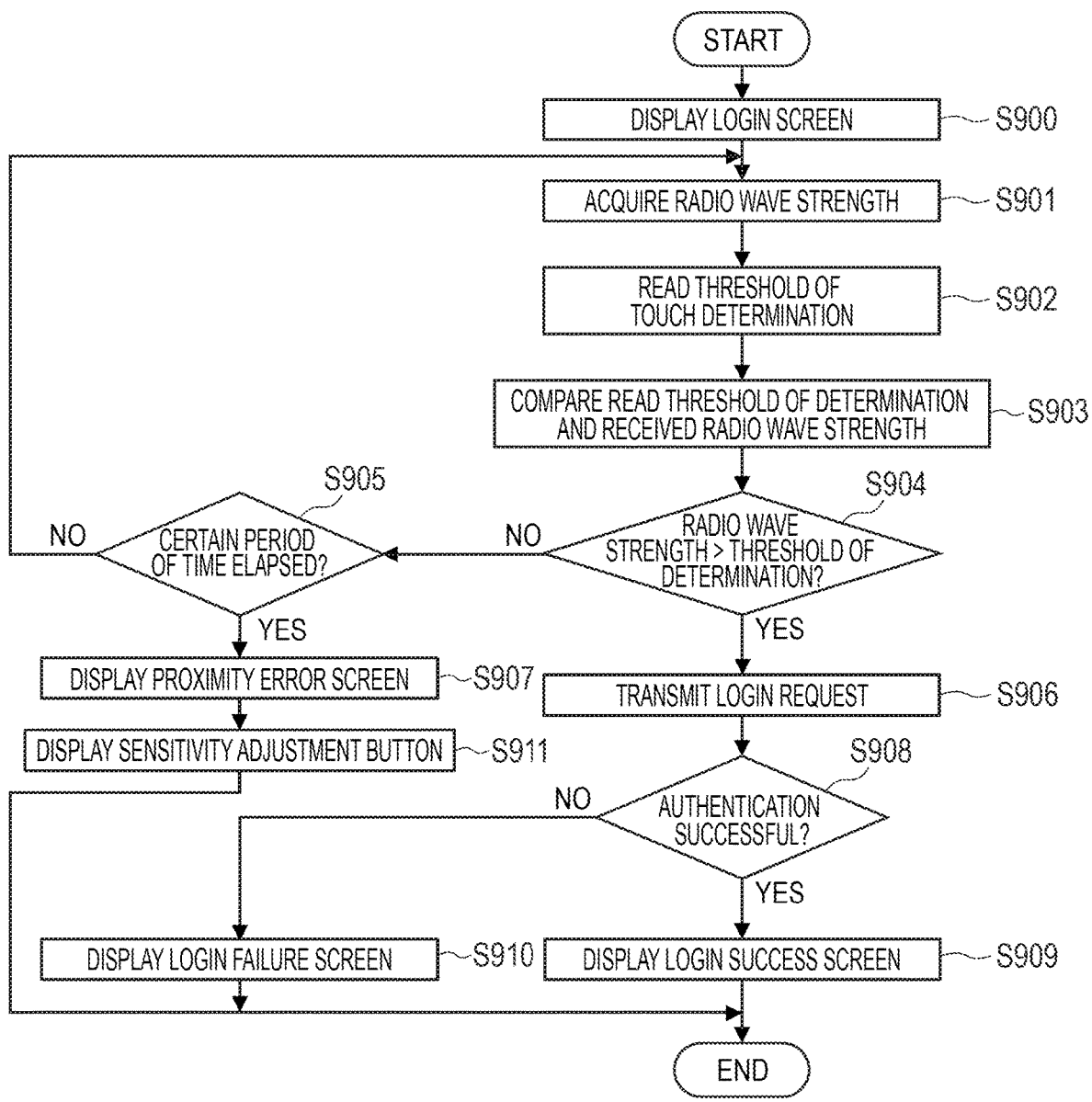
FIG. 9 is a flow chart for describing an example of an information process of performing login.

In the mobile terminal 102 of the present embodiment, on the premise that the CPU 211 processes programs stored in the flash memory 213 by using the memory (RAM 212), software configuration of the mobile terminal 102 in later-described FIG. 3B and the like are realized. Similarly, on the premise that the CPU 211 processes programs stored in the flash memory 213 by using the memory (RAM 212), processes of flow charts illustrated in later-described FIGS. 6 and 9 are realized.

(Software Configuration)

Figure 3A:
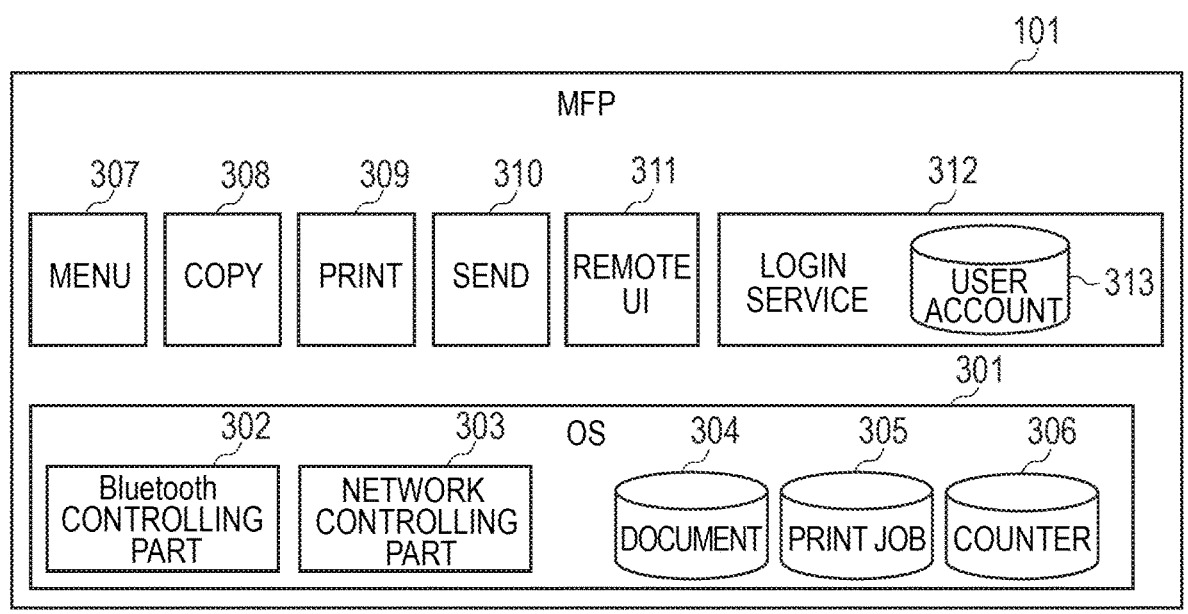
FIGS. 3A and 3B are diagrams for illustrating an example of a software configuration and the like of the apparatuses/devices included in the communicating system.
Figure 3B:
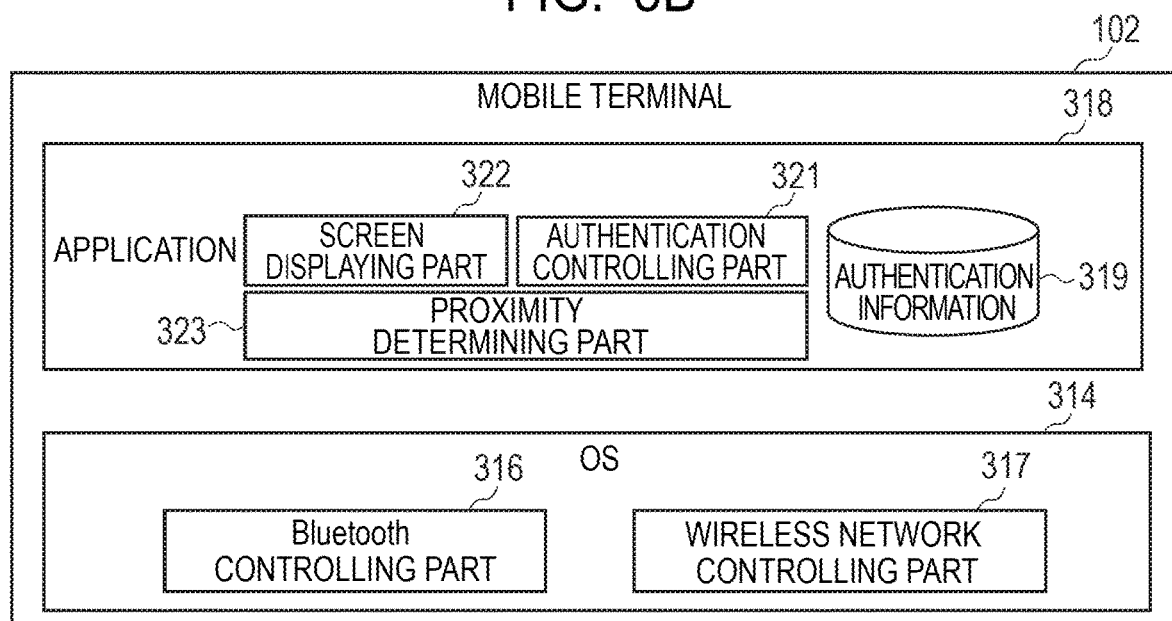

FIGS. 3A and 3B are diagrams for illustrating an example of software configurations and the like of the apparatuses/devices included in the communicating system.

FIG. 3A is the diagram for illustrating the example of the software configuration of the MFP 101 and a data area managed by the software. Each of a document 304, a print job 305, a counter 306 and a user account 313 indicates a data area of data recorded and managed by the software in the RAM 203 and the HDD 204. An OS (operating system) 301 is an operating system serving as basic software. The OS 301 includes a group of device drivers for controlling various kinds of hardware, and provides an API (application programming interface) for using the hardware for applications operating on the OS. For example, a Bluetooth® controlling part 302 is a device driver for controlling the Bluetooth® I/F 209. A network controlling part 303 is a device driver for controlling the network I/F 210. In addition, although it is not illustrated in FIG. 3A, a printer module for controlling the printer 206 and a scanner module for controlling the scanner 207 exist in the OS 301. Besides, the OS 301 provides APIs for reading and writing data of the document 304, the print job 305 and the counter 306 to the applications.

Each of a copy 308, a print 309 and a send (transmit) 310 is an application running on the OS 301, and displays a user interface for providing various functions to the operation unit 205. For example, the copy 308 controls the scanner 207 and the printer 206 via the OS 301, thereby performing copying. The print 309 provides a function of printing document data stored in the document 304 and print job data stored in the print job 305. Copy and print outputting are performed via the API of the OS 301, and the OS 301 records the number of prints in the counter 306. The send 310 provides a function of transmitting the document data acquired from the scanner 207 to the outside. A menu 307 is a module for displaying a menu which causes to select the application (for example, copy, print or send) from the operation unit 205. A remote UI (user interface) 311 is a module for providing a user interface written in the HTML (HyperText Markup Language) when accessed to the MFP 101 from a web browser of the mobile terminal based on the HTTP (HyperText Transfer Protocol). The remote UI 311 provides a user interface for managing settings of the MFP and a user interface for printing the document data stored in the document 304. A login service 312 is a module for providing a login function when using the MFP. The user account 313 is a database for managing and storing an account ID (identification data) and a password of each user, and is recorded in the RAM 203 and/or the HDD 204. The login service 312 provides a login service for the MFP 101 to the outside, by using the user account 313.

The login service 312 determines whether or not to permit login by a user based on user information (a user ID and a password) input via the operation unit 205 of the MFP 101. As just described, in the MFP 101, when the login by the user is permitted, a screen by which respective functions such as a copy function, a scan function and the like provided in the MFP 101 can be used is displayed, so that each function is available via the operation unit 205. On the other hand, when the login by the user is not permitted or when the user does not log in, the use of each function is restricted. When the user does not log in, it is assumed that the MFP 101 displays a login screen for accepting the login by the user on the operation unit 205. The login service 312 also provides a login service for logging in to the MFP 101 from an external device.

FIG. 3B is the diagram for illustrating the example of the software configuration of the mobile terminal 102 and a data area managed by the software. Besides, authentication information 319 indicates a data area of data to be recorded and managed by the software in the flash memory 213. An OS 314 is an operating system for controlling the entire operations of the mobile terminal 102. The OS 314 includes a group of device drivers for controlling various kinds of hardware, and provides an API for using various hardware for applications operating on the OS 314. In the present embodiment, the group of device drivers includes a Bluetooth® controlling part 316 and a wireless network controlling part 317. The Bluetooth® controlling part 316 is a device driver for controlling the Bluetooth® I/F 215. The wireless network controlling part 317 is a device driver for controlling the wireless network I/F 216. Various applications can be installed in the mobile terminal 102 and operated on the OS 314. In the present embodiment, it is assumed that an application 318 has been installed in advance. Here, it should be noted that the application 318 has the following authentication function.

Set in advance the user authentication information (a user name, a password) to be used in case of a login request.

In this function, a screen is prepared by a screen displaying part 322, and a user inputs the user authentication information according to the relevant screen. The input user authentication information is stored in the authentication information 319 in the flash memory 213.

Display a screen for urging to bring the mobile terminal 102 close to the MFP 101 for login.

While the screen is being displayed, the Bluetooth® controlling part 316 measures a radio wave strength when receiving a Bluetooth® radio wave. A proximity determining part 323 of the application 318 determines whether or not the mobile terminal 102 is in close proximity to the MFP 101.

When it is determined that the mobile terminal is in close proximity to the MFP, perform the login request by communicating with the MFP 101.

An authentication controlling part 321 controls transmission of the login request. The wireless network controlling part 317 transmits the login request by wirelessly communicating with the MFP 101. For example, the login request is transmitted to the MFP 101 by a GATT (generic attribute profile) communication of the Bluetooth® LE established between the mobile terminal and the MFP 101. The login request includes the authentication information 319 (the user name and the password) in the flash memory 213.

Upon receiving the login request, the MFP 101 determines whether or not login of the user is permitted, according to the login request from the mobile terminal 102. The login service 312 determines whether or not the authentication information of the user included in the received login request is included in the user account 313. When the authentication information is included in the user account, the login is permitted.

In the case of permitting the login, the MFP 101 displays on the operation unit 205 a screen by which each function such as the copy function, the scan function or the like of the MFP 101 can be used, according to the authority of the authenticated user. Then, the MFP transits to a state in which each function can be used via the operation unit 205. Therefore, by only bringing the mobile terminal 102 close to the MFP 101, the user can transit the MFP to the state in which each operation of the MFP 101 can be used via the operation unit 205 of the MFP 101. Hereinafter, to cause the user to log in to the MFP 101 and cause to transit to the state in which each function of the MFP 101 can be used via the operation unit 205 is referred to as multifunction machine panel login.

(Login Function Screen)

FIGS. 4A, 4B, 4C and 4D are diagrams for respectively illustrating examples of a screen related to the login function of the mobile terminal 102. The application 318 installed in the mobile terminal 102 of the present embodiment displays the top menu screen 400 illustrated in FIG. 4A on the operation unit 214 of the mobile terminal 102 immediately after the application is activated.

The application 318 displays the MFP 101 selected by the application 318 in an area 401 on the top menu screen 400.

A multifunction machine panel login button 402 on the top menu screen 400 is a button for providing a function of logging in to the MFP 101. When the multifunction machine panel login button 402 is selected, the application 318 displays a multifunction machine panel login screen (a login screen 410) illustrated in FIG. 4B on the operation unit 214.

A printer registration function button 403 on the top menu screen is a button for providing a function of newly registering a printer. When the printer registration function button 403 is selected, the application 318 displays a printer selection screen 420 illustrated in FIG. 4C on the operation unit 214.

Figure 4A:
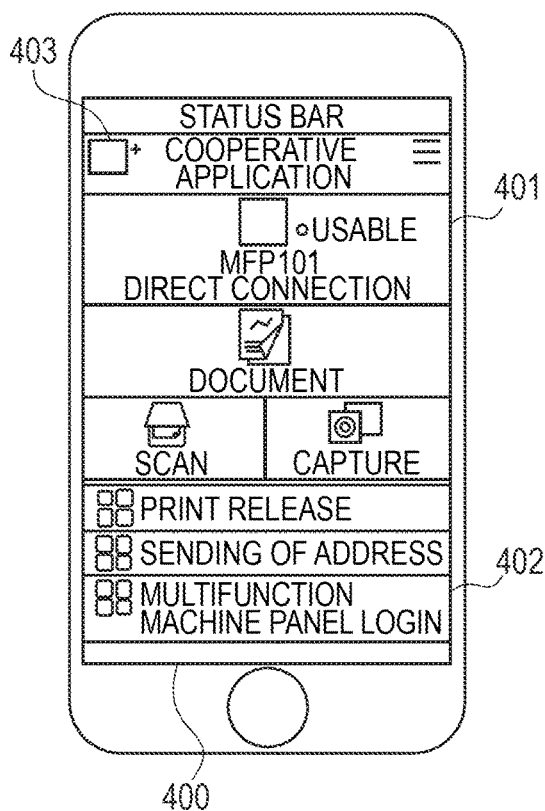
FIGS. 4A, 4B, 4C and 4D are diagrams for illustrating examples of a screen related to a login function of a mobile terminal.
Figure 4B:
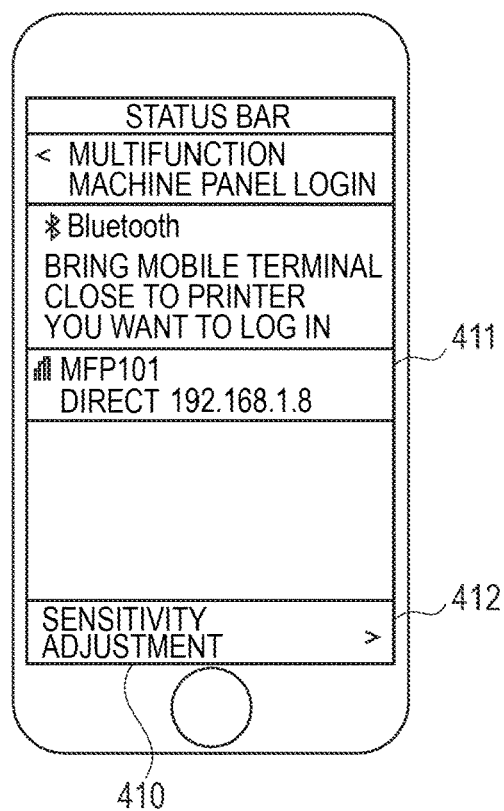

FIG. 4B is the diagram for illustrating the login screen 410 which displays a multifunction machine login function. Upon transition to the login screen, the application 318 acquires, from the Bluetooth® controlling part 316, a Bluetooth® radio wave strength and advertising packet information received from the MFP 101 by the Bluetooth® communication. The received Bluetooth® radio wave strength is expressed by an RSSI (Received Signal Strength Indication), and the unit thereof is dbm (decibel-milliwatts).

An advertising packet includes such data as follows.

RSSI Value

This value indicates the radio wave strength of the received Bluetooth® radio wave, and the unit thereof is dbm, for example, −40 dbm.

Local Name

This name indicates a device name or the like, for example, MFP CXXX.

Manufacturer Specific Data

As this data, a company identifier and arbitrary data are stored.

Service UUIDs (Universally Unique Identifiers)

The UUID indicates a function of a device.

The application 318 determines whether or not the application 318 is the MFP supporting communication control, based on the device name and the company identifier included in the advertising packet information of the received Bluetooth® radio wave.

When the application is the MFP supporting the communication control, the application 318 displays an indicator indicating the radio wave strength and information 411 as the printer information based on the advertising packet information included in the received Bluetooth® radio wave.

In accordance with the instruction on the screen of FIG. 4B, the user brings the mobile terminal 102 close to the printer (for example, the MFP 101) that the user wishes to log in.

While the screen illustrated in FIG. 4B is being displayed, the application 318 acquires the Bluetooth® radio wave strengths received from the Bluetooth® controlling part 316 at a regular interval, and determines whether or not a proximity condition is satisfied. When the proximity condition is satisfied, the application 318 establishes the Bluetooth® LE communication with the MFP which satisfies the proximity condition, and transmits the login request. On the other hand, when the proximity condition is not satisfied for a certain period of time or more, the application 318 transitions the screen of the operation unit 214 to the screen illustrated in FIG. 4D.

Further, when a sensitivity adjustment button 412 is selected by the user, the application 318 transitions the screen of the operation unit 214 to a proximity sensitivity adjustment screen 500 illustrated in later-described FIG. 5A.

Figure 4C:
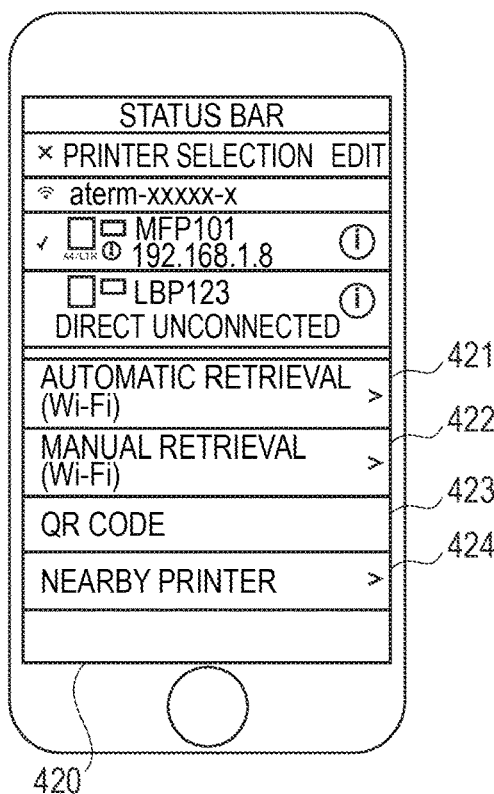

FIG. 4C is the diagram for illustrating the printer selection screen 420 on which the currently selected MFP 101 and the already registered LBP 123 are displayed. When performing the document print function and the scan function illustrated in FIG. 4A via the selection screen, the user can select the MFP being a cooperative destination (or an alliance partner). The MFP selected as the cooperative destination is displayed in the area 401 of FIG. 4A. Besides, the user can search for a printer to be newly registered as a cooperative destination via the printer selection screen 420. In the printer selection screen 420, four methods are exemplified as printer search functions.

The first is automatic search (Wi-Fi®). Upon selection of an automatic search (Wi-Fi®) button 421, the application 318 requests the wireless network controlling part 317 to perform broadcasting, and displays the detected printer on the operation unit 214. The second is manual search (Wi-Fi®). Upon selection of a manual search (Wi-Fi®) button 422, the application 318 detects whether or not a printer having an IP (Internet Protocol) address input by the user exists in the wireless network controlling part 317. The application 318 displays the detected printer on the operation unit 214.

The third is QR (Quick Response) Code®. Upon selection of a QR Code® button 423, the application 318 detects whether or not a printer having an IP address input by the QR Code® in the wireless network controlling part 317. The application 318 displays the detected printer on the operation unit 214.

The fourth is a nearby printer. Upon selection of a nearby printer button 424, the application 318 detects whether or not a printer exists around the MFP 101 by proximity wireless communication such as the Bluetooth® communication or the like. When the nearby printer button is selected, the application 318 receives a Bluetooth® communication radio wave for the Bluetooth® controlling part 316.

Figure 4D:
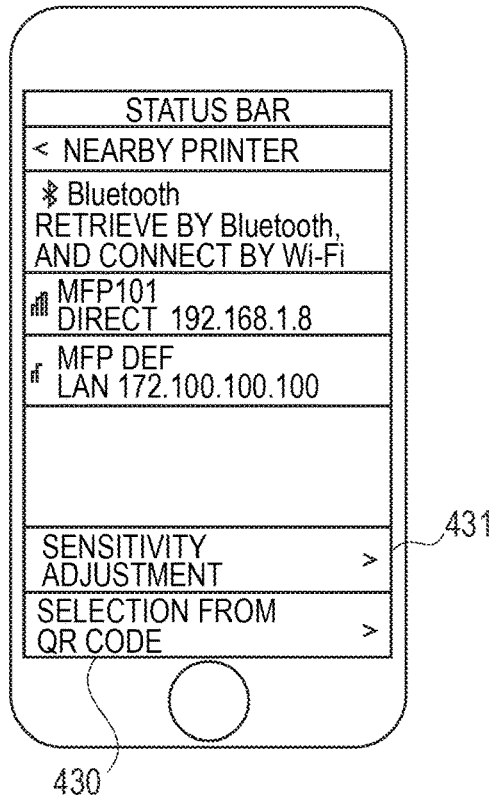

FIG. 4D the diagram for illustrating the screen for searching for the nearby printer by the Bluetooth® communication. The application 318 displays a search result screen 430 while waiting for the radio wave reception from the Bluetooth® controlling part 316. The user can newly register the MFP at the cooperative destination by selecting information indicating the MFP (for example, the MFP 101, an MFP DEF) displayed in FIG. 4D. Besides, when the user selects a sensitivity adjustment button 431, the application 318 transitions the screen of the operation unit 214 to the proximity sensitivity adjustment screen 500. The application 318 acquires, by a sensitivity adjustment function, a measured value to be used for deriving a threshold for the proximity determination, and adjusts the threshold for the proximity determination based on the acquired measured value.

(Sensitivity Adjustment Screen)

Figure 5A:
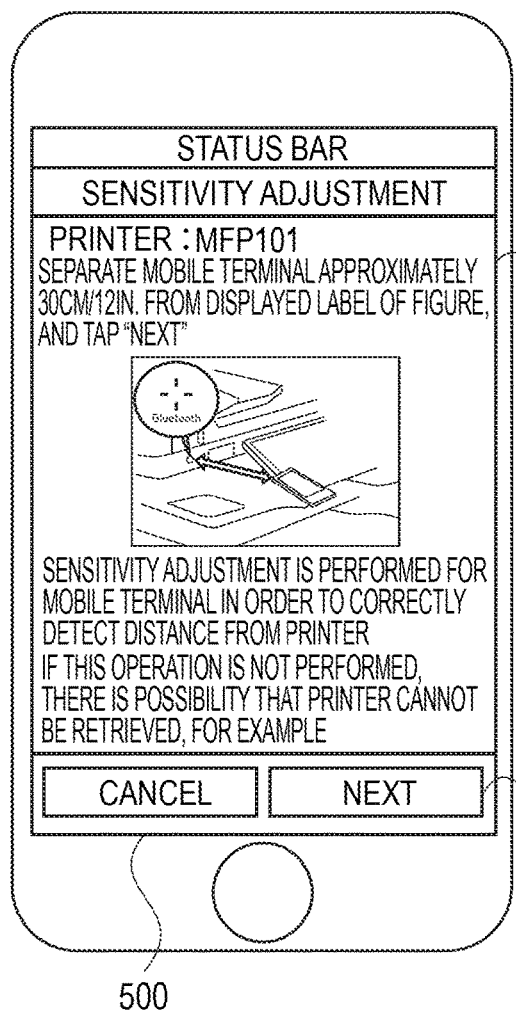
FIGS. 5A and 5B are diagrams for illustrating examples of a screen related to a sensitivity adjustment function of the mobile terminal.
Figure 5B:
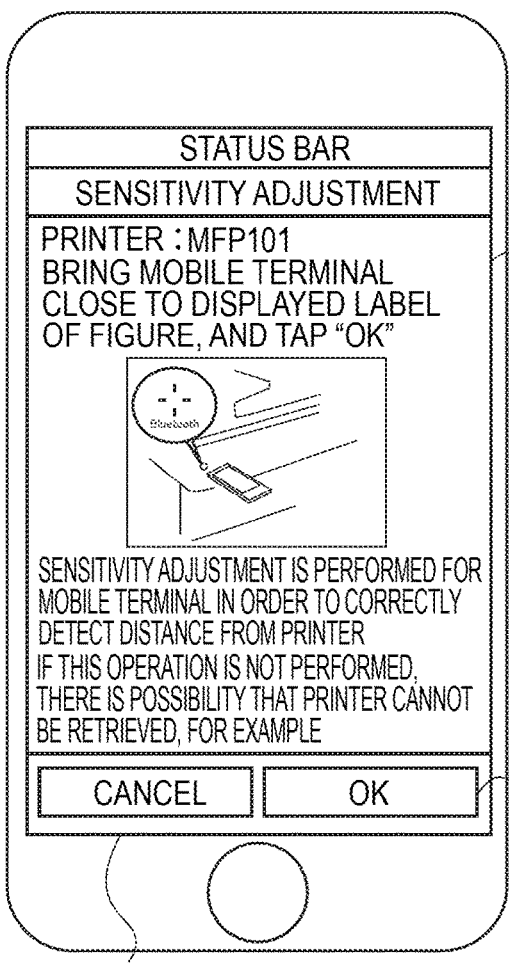

FIGS. 5A and 5B are diagrams for illustrating examples of the screen related to the sensitivity adjustment function of the mobile terminal 102. The application 318 installed in the mobile terminal 102 of the present embodiment has the sensitivity adjustment function. When the sensitivity adjustment button 412 or 431 is selected, the application 318 displays the proximity sensitivity adjustment screen 500 illustrated in FIG. 5A on the operation unit 214 of the mobile terminal 102.

The proximity sensitivity adjustment screen 500 includes information indicating the MFP 101 which is the currently selected printer, and information for urging the user to select (or tap) a next button 502 in a state that the mobile terminal is separated from the MFP 101 by approximately 30 cm/12 in. At the timing when the user selects the next button 502, the application 318 performs the following process. That is, the application 318 acquires the Bluetooth® radio wave strength received from the Bluetooth® controlling part 316, and stores the value of the acquired radio wave strength in the flash memory 213 as the measured value of the radio wave strength at the distance of about 30 cm from the MFP 101. Incidentally, the measured value here may be used as a threshold to be used for the proximity determination at the distance of about 30 cm from the MFP 101. The distance of about 30 cm from the MFP 101 is hereinafter referred to as IMMIDIATE. When the next button 502 is selected, the application 318 transitions the screen of the operation unit 214 to a touch sensitivity adjustment screen 510.

The touch sensitivity adjustment screen 510 includes the information indicating the MFP 101 which is the currently selected printer, and information for urging the user to select (or tap) an OK button 512 in a state that the mobile terminal is in contact with the MFP 101. At the timing when the user selects the OK button 512, the application 318 performs the following process. That is, the application 318 acquires the Bluetooth® radio wave strength received from the Bluetooth® controlling part 316, and stores the value of the acquired radio wave strength in the flash memory 213 as the measured value of the radio wave strength at a distance of 0 cm from the MFP 101. The distance of 0 cm from the MFP 101 is hereinafter referred to as TouchLike.

(Mobile Terminal: Flow Chart for Describing Information Process of Performing Sensitivity Adjustment from Sensitivity Adjustment Screen)

FIG. 6 is a flow chart for describing an example of an information process of receiving the Bluetooth® radio wave transmitted from the MFP 101 and performing sensitivity adjustment in the mobile terminal 102. When the sensitivity adjustment button 412 or 431 is selected from the mobile terminal 102 by the user, the application 318 starts the process of the relevant flow chart. Here, the sensitivity adjustment button 412 can be selected from the login screen 410 of the multifunction peripheral panel login, and the sensitivity adjustment button 431 can be selected from the search result screen 430 for the nearby printer search function.

In S800, the application 318 displays the proximity sensitivity adjustment screen 500 on the operation unit 214. The process of S800 is an example of a first displaying process of causing the operation unit to display a first screen for acquiring the radio wave strength related to the wireless communication at a first distance from the MFP.

In S801, the application 318 displays a message 501 for urging the user to select the next button 502 in the state that the mobile terminal 102 and the MFP (for example, the MFP 101) which is the target of the sensitivity adjustment are separated from each other by about 30 cm. Hereinafter, for the sake of explanation, a case where the MFP being the target of the sensitivity adjustment is the MFP 101 will be described as an example.

In S802, the application 318 determines whether or not the next button 502 is selected by the user. When the application 318 determines that the next button 502 is selected (YES in S802), the process proceeds to S803. On the other hand, when determining that the next button 502 is not selected (NO in S802), the process returns to S801.

In S803, the application 318 cooperates with the Bluetooth® controlling part 302 to acquire the radio wave strength of the Bluetooth® advertising packet transmitted from the MFP 101 which is the cooperative destination. Incidentally, it is also possible here to acquire the radio wave strengths of a plurality of advertising packets (for example, 30 times) received after the selection of the next button 502 and derive the radio wave strength from the median value or the average value thereof. For example, the CPU 211 sorts the array in which the received radio wave strengths of the plurality of advertising packets are stored, and extracts the central portion (for example, the portion excluding the lower 10% and the upper 10%) of the array as samples. By using the average value of the extracted samples as a threshold, the CPU 211 can avoid an influence of disturbance caused by a surrounding wireless environment and the like.

In S804, the application 318 stores, in the nonvolatile flash memory 213, the acquired radio wave strength as the measured value of the radio wave strength in the IMMIDIATE corresponding to the distance of 30 cm.

FIG. 7A is a diagram for illustrating the measured values and the estimated values of the radio wave strengths at the respective distances. The threshold stored in S804 is the measured value corresponding to the distance of 30 cm, and is the values of an RSSI measured value 601 and an RSSI threshold 611. For example, the application 318 stores −24 dbm as the value of the MFP 101 and −51 dbm as the value of an MFP 110, in the RSSI measured value 601 and the RSSI threshold 611.

In S805, the application 318 determines whether or not the MFP 101 being the target of the sensitivity adjustment has a cooperative function (provision function) of performing the determination of the TouchLike as a trigger. The function which is provided by the cooperation of the MFP and the mobile terminal in the TouchLike determination includes, for example, the previously described panel login function. Further, the above function includes a touch print function of causing to perform printing by using, as a trigger, a fact that the MFP and the mobile terminal come to be in close proximity. Furthermore, the above function includes a touch scan function of reading an original document and then transmitting the read original document to the outside or the mobile terminal, by using, as a trigger, a fact that the MFP and the mobile terminal come to be in close proximity. It is assumed that the capability possessed by the MFP 101 has been acquired by the previously performed process of registering the MFP of the cooperative destination.

When the application 318 determines that the MFP 101 being the target of the sensitivity adjustment has the provision function by the TouchLike determination (YES in S805), the process proceeds to S806. On the other hand, when the application 318 determines that the MFP being the target of the sensitivity adjustment does not have the provision function by the TouchLike determination (NO in S805), the process of the flow chart illustrated in FIG. 6 ends. By the process of S805, in the case of performing the sensitivity adjustment for the apparatus which does not have the function using the TouchLike determination as the trigger, it is possible to end the sensitivity adjustment without causing the user to perform the operation associated with the processes of S806 and the subsequent steps.

In S806, the application 318 transitions the screen of the operation unit 214 to the touch sensitivity adjustment screen 510. Then, the application 318 displays, on the touch sensitivity adjustment screen 510, a message 511 for urging the user to select the OK button 512 in a state that the mobile terminal 102 and the MFP 101 are in contact with each other (about 0 cm apart). The process of S806 is an example of the first displaying process of causing the operation unit to display a second screen for acquiring the radio wave strength related to the wireless communication at a second distance from the MFP.

In S807, the application 318 determines whether or not the OK button 512 is selected by the user. When the application 318 determines that the OK button 512 is selected (YES in S807), the process proceeds to S808. On the other hand, when determining that the OK button 512 is not selected (NO in S807), the process returns to S806.

In S808, the application 318 acquires the radio wave strength of the Bluetooth® radio wave from the Bluetooth® controlling part 302 by the Bluetooth® I/F.

In S809, the application 318 stores the acquired radio wave strength in the nonvolatile flash memory 213 as the measured value corresponding to the distance of 0 cm.

The measured value stored in S809 is the measured value corresponding to the distance of 0 cm, and this value is the value of an RSSI measured value 602 of FIG. 7A. Incidentally, as well as the process of S804, it may be possible to extract samples from a plurality of advertising packets and store an average value of the extracted samples. For example, the application 318 stores −18 dbm as the value of the MFP 101 and −12 dbm as the value of the MFP 110.

In S810, the application 318 connects the two points of the radio wave strength at the distance of 0 cm and the radio wave strength at the distance of 30 cm to acquire a straight line, and then calculates a gradient (or an inclination) and an intercept of the straight line.

Figure 8:
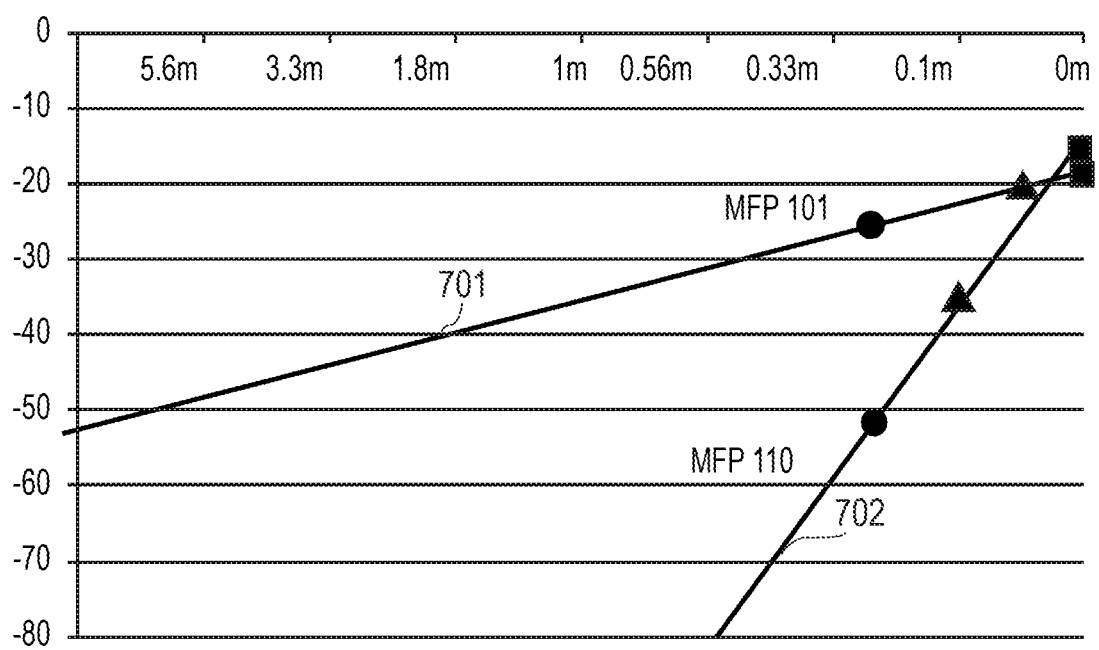
FIG. 8 is a diagram for describing an example of threshold calculation of TouchLike.

FIG. 8 is a diagram for describing an example of threshold calculation of the TouchLike by the measurements of 0 cm and 30 cm. Since a radio wave strength in wireless communication generally has a property of attenuating in inverse proportion to the square of a distance, the horizontal axis is plotted with the square of the distance (unit is m) and the vertical axis is set as the radio wave strength (unit is dbm). By connecting the square mark as the measurement result of 0 cm and a circle as the measurement result of 30 cm with each other, it is possible for the application 318 to calculate the gradient and the intercept for each MFP like a straight line 701 and a straight line 702.

In S811, the application 318 determines whether or not the calculated gradient of the straight line is equal to or larger than a predetermined threshold. When the application 318 determines that the calculated gradient of the straight line is equal to or larger than the predetermined threshold (YES in S811), the process proceeds to S812. On the other hand, when determining that the calculated gradient of the straight line is smaller than the predetermined threshold (NO in S811), the process proceeds to S813. The predetermined threshold is held as a fixed value inside the application 318, and, for example, the gradient of the predetermined threshold is 1. For example, in the example of FIG. 8, the application 318 determines that the gradient of the straight line 701 of the MFP 101 is smaller than the predetermined threshold, and determines that the gradient of the straight line 702 of the MFP 110 is equal to or larger than the predetermined threshold.

In S812, the application 318 calculates the radio wave strength at the distance of 10 cm from the calculated gradient of the straight line. For example, since the straight line 702 of the MFP 110 has the gradient equal to or larger than the predetermined threshold, the application 318 calculates, as an allowable value of the TouchLike, −35 dbm corresponding to the value of the triangle mark as the radio wave strength at 10 cm so as to regard as the TouchLike determination up to the distance of about 10 cm. This is because since dispersion of the radio wave strengths depending on the distances is large when the gradient is larger than the predetermined threshold, it is difficult to perform accurate proximity determination unless an allowable range is made larger to a certain extent. Thus, when the user brings the mobile terminal 102 close to the MFP 110, even if radio wave strength reception disperses to some extent, the accuracy of the TouchLike determination improves so that it is possible to reduce a case where the user cannot log in. For example, the application 318 stores the calculated −35 dbm in an RSSI estimated value 604 of the MFP 110 of FIG. 7A stored in the nonvolatile flash memory 213.

In S813, the application 318 calculates the radio wave strength at the distance of 5 cm from the calculated straight line. For example, since the straight line 701 of the MFP 101 has the gradient smaller than the predetermined threshold, the application 318 calculates, as the allowable value of the TouchLike, −21 dbm corresponding to the value of the triangle mark as the radio wave strength at 5 cm so as to regard as the TouchLike determination up to the distance of about 5 cm. When the gradient is smaller than the predetermined threshold, the dispersion of the radio wave strengths depending on the distances is small. Therefore, if 10 cm is set as the allowable range, a possibility of login even at a distance exceeding the allowable range is higher than when the gradient is high. Since login in a state being away has a security risk, the distance to be the allowable value is made small in order to suppress the relevant security risk. For example, the application 318 stores the calculated −21 dbm in an RSSI estimated value 603 of the MFP 101 of FIG. 7A stored in the nonvolatile flash memory 213.

In S814, the application 318 stores the calculated radio wave strength in the nonvolatile flash memory 213 as the threshold to be used for the TouchLike determination. Accordingly, in the case of the MFP 101 of which the gradient is smaller than the predetermined threshold, the application 318 stores the calculated value (for example, −21 dbm) calculated under the condition equivalent to the distance of 5 cm, as the threshold for the TouchLike determination. On the other hand, in the case of the MFP 110 of which the gradient is larger than the predetermined threshold, the application 318 stores the calculated value (for example, −35 dbm) calculated under the condition equivalent to the distance of 10 cm, as the threshold for the TouchLike determination. Here, the processes of S812, S813 and S814 are examples of a process of determining the thresholds of proximity determination based on the radio wave strengths concerning the wireless communication acquired at the positions different in distance from the MFP.

Incidentally, in the processes of S811 to S813, the case where the threshold for the TouchLike determination is made different by making the condition (parameter) for calculating the threshold for the TouchLike determination different has been exemplified. However, the present invention is not limited to this. For example, without depending on the gradient, it may be possible to calculate a range of the radio wave strength regarded as the TouchLike determination, on the basis of a condition of 5±Δx [cm] (for example, Δx is 2 cm) and a calculated linear expression.

(Mobile Terminal: Flow Chart for Describing an Information Process of Performing Login to MFP from Login Screen)

FIG. 9 is a flow chart for describing an example of an information process in which the mobile terminal 102 comes to be in close proximity to the MFP 101 and login is performed.

In S900, the application 318 displays the login screen 410 on the operation unit 214.

In S901, the application 318 acquires the Bluetooth® radio wave strength from the Bluetooth® controlling part 302. While the login screen 410 is being displayed on the operation unit 214, the application 318 periodically acquires the Bluetooth® radio wave strengths received from the Bluetooth® controlling part 316 at a regular interval. Then, the application 318 derives the average value of the radio wave strengths acquired a plurality of times, and sets the derived average value as the received Bluetooth® radio wave strength. The process of S901 is an example of a process of acquiring the radio wave strength related to the wireless communication with the MFP.

In S902, the application 318 reads a TouchLike threshold to be used for the login determination function from a threshold table 610 in the flash memory 213, and sets the read threshold as a threshold of determination. Here, it is assumed that the application 318 holds a table as illustrated in FIG. 7B for each function to be provided, and holds a threshold in the table. That is, for each function to be provided, the application 318 determines and holds the threshold of the proximity determination based on the radio wave strength acquired at a different distance. Since there are the different distances of determination such as the TouchLike, the IMMIDIATE and a NEAR depending on the functions to be provided, the application 318 can select the threshold according to the function from the table in the flash memory 213. In other words, the application 318 acquires the held threshold according to the function to be provided, and sets the acquired threshold as the threshold of determination.

In S903, the application 318 compares the read threshold of determination with the acquired radio wave strength.

In S904, as a result of the comparison between the threshold of determination and the received radio wave strength, the application 318 determines whether or not the radio wave strength is larger than the threshold of determination. When the application 318 determines that the radio wave strength is larger than the threshold of determination (YES in S904), the process proceeds to S906. On the other hand, when determining that the radio wave strength is equal to or smaller than the threshold of determination (NO in S904), the process proceeds to S905. The process of S904 is an example of a process of determining whether or not the mobile terminal and the MFP are in close proximity by using the threshold of proximity determination.

In S905, the application 318 determines whether or not a state that the proximity determination condition is not satisfied continues for a certain period of time. Here, it is assumed that the value of the certain period of time is held in the flash memory 213. When the application 318 determines that the state that the proximity determination condition is not satisfied continues for the certain period of time (YES in S905), the process proceeds to S907. On the other hand, when the application 318 determines that the state that the proximity determination condition is not satisfied does not continue for the certain period of time (NO in S905), the process returns to S901 to receive the radio wave again.

In S906, since the proximity determination condition is satisfied, the application 318 transmits login information from the authentication information 319 to the MFP 101 via the wireless network controlling part 317.

In S908, the application 318 receives, from the MFP 101, information indicating whether or not the authentication is successful, as a result of the transmission of the login information. Based on the information received from the MFP 101, the application 318 determines whether or not the authentication is successful. When the application 318 determines that the authentication is successful (YES in S908), the process proceeds to S909. On the other hand, when determining that the authentication fails (NO in S908), the process proceeds to S910.

In S909, upon the successful login to the MFP 101, the application 318 displays a login success screen on the screen displaying part.

In S910, upon the failure of login to the MFP 101, the application 318 displays a login failure screen on the operation unit 214.

In S907, the application 318 displays a proximity error screen on the operation unit 214.

In S911, the application 318 displays the sensitivity adjustment button 412 enabling to transition to a screen on which sensitivity adjustment can be performed, on the proximity error screen or the like of the operation unit 214. When the sensitivity adjustment button 412 is selected by the user, the application 318 moves the process to that of the flow chart illustrated in FIG. 6, and ends the process of the flow chart illustrated in FIG. 9.

As just described, according to the present embodiment, by performing the sensitivity adjustment at the two distances, it is possible to improve the proximity determination accuracy also with respect to the proximity determination for an unadjusted distance.

Besides, by switching the allowable distance error depending on whether or not the gradient is equal to or larger than the predetermined threshold, it is possible to provide the login function with higher distance accuracy for the user.

When the gradient is large, that is, when the attenuation rate due to the distance of the radio wave strength is high, it is possible, by setting the distance error allowed in the proximity determination to be larger than the case where the gradient is small, to reduce the cases where the login cannot be performed due to the dispersion of the radio wave strengths.

On the other hand, when the gradient is small, that is, when the attenuation rate due to the distance of the radio wave strength is low, it is possible, by setting the distance error allowed in the proximity determination to be smaller than the case where the gradient is large, to realize a touch-like operational feeling with security risk suppressed.

<Modification>

In the present embodiment, the case of performing the calculation based on the linear expression in order to calculate the threshold at the unmeasured distance is exemplified. However, the present invention is not limited to this. That is, the application 318 can perform Nth-order polynomial approximation based on the measurement result, thereby calculating a threshold at an unmeasured distance. Besides, it may be possible to perform the proximity determination between devices based on an estimated distance. For example, it may be possible to estimate the distance between the devices from a ratio of a transmission signal strength (Tx) included in the advertising packet and a reception signal strength, and determine a degree of proximity based on the estimated distance. In this case, as the threshold of the proximity determination, it is assumed that the distance is stored instead of the signal strength explained in FIG. 7B. Also, it may be possible to determine a degree of proximity of a communication terminal and an external device being the login target by another method such as, for example, Wi-Fi Aware® or the like. In this case, a threshold based on RTT (Round Trip Time) of wireless communication between devices or the like is stored as the threshold of the proximity determination.

Besides, in the present embodiment, as illustrated by 610 of FIG. 7B, the case where the reception signal strength is stored as the threshold of the determination is exemplified (611, 612). However, the present invention is not limited to this. That is, for example, it is possible to store a threshold in the form of a difference value (offset) for a reference radio wave strength.

Other Embodiments

The present invention can be realized on the premise that a program for realizing one or more functions of the above embodiment is supplied to a system or an apparatus via a network or a storage medium, and one or more processors in a computer of the system or the apparatus reads and executes the program. Besides, the present invention can be realized also by a circuit (for example, ASIC (application specific integrated circuit)) which realizes one or more functions.

As just described, although the example of the embodiment of the present invention has been described in detail, the present invention is not limited to the suchlike specific embodiment.

For example, the hardware constitution of the mobile terminal 102 is an example, so that a GPU (graphics processing unit) may be used instead of the CPU. Further, the hardware constitution of the mobile terminal 102 is not limited to one CPU, one RAM, one flash memory and the like. Namely, a plurality of CPUs may execute the program while using a plurality of RAMs, a plurality of flash memories, and the like, thereby realizing the processes in the above-described flow charts.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-099016, filed May 18, 2017, which is hereby incorporated by reference herein in its entirety.

What is claimed is:

1. A non-transitory computer-readable storage medium which stores a program that causes a processor of a communication terminal to perform:
   accepting a predetermined user's operation for performing adjustment related to radio wave reception;
   acquiring first information indicating a first radio wave strength of a first packet that the communication terminal receives at a first distance from an external device at least after accepting the predetermined user's operation;
   acquiring second information indicating a second radio wave strength of a second packet that the communication terminal receives at a second distance from the external device at least after receiving the first packet, wherein the second distance is different from the first distance;
   deriving, based on the acquired first information and the acquired second information, an equation about a relationship between radio wave strengths and distances;
   updating information related to the radio wave reception based on the equation; and
   determining whether a predetermined condition is satisfied or not, based on the updated information and a radio wave strength of a packet received from an external device after completing the update of the information.

2. The storage medium according to claim 1,
   wherein the first information is acquired based on the first radio wave strength of the first packet received by the communication terminal when a first user's instruction is received on a touch panel of the communication terminal, and
   wherein the second information is acquired based on the second radio wave strength of the second packet received by the communication terminal when a second user's instruction is received on the touch panel of the communication terminal.

3. The storage medium according to claim 2,
   wherein the first user's instruction is a user's selection for a first button displayed on the touch panel of the communication terminal, and
   wherein the second user's instruction is a user's selection for a second button displayed on the touch panel of the communication terminal.

4. The storage medium according to claim 1, wherein the program causes the processor to further perform determining, based on the updated information and the radio wave strength of the packet received from the external device after completing the update of the information, whether the predetermined condition indicating the communication terminal is in close proximity to the external device which transmitted the packet is satisfied or not.

5. The storage medium according to claim 1, wherein the program causes the processor to further perform transmitting a login request to the external device in a case where it is determined that the predetermined condition is satisfied.

6. A method executed by a communication terminal, comprising:
   accepting a predetermined user's operation for performing adjustment related to radio wave reception;
   acquiring first information indicating a first radio wave strength of a first packet that the communication terminal receives at a first distance from an external device at least after accepting the predetermined user's operation;
   acquiring second information indicating a second radio wave strength of a second packet that the communication terminal receives at a second distance from the external device at least after receiving the first packet, wherein the second distance is different from the first distance;
   deriving, based on the acquired first information and the acquired second information, an equation about a relationship between radio wave strengths and distances;
   updating information related to the radio wave reception based on the equation; and
   determining whether a predetermined condition is satisfied or not, based on the updated information and a radio wave strength of a packet received from an external device after completing the update of the information.

7. A communication terminal comprising:
at least one memory that stores a set of instructions; and
at least one processor that executes the instructions, the instructions, when executed, causing the information processing apparatus to perform operations comprising:
accepting a predetermined user's operation for performing adjustment related to radio wave reception;
acquiring first information indicating a first radio wave strength of a first packet that the communication terminal receives at a first distance from an external device at least after accepting the predetermined user's operation;
acquiring second information indicating a second radio wave strength of a second packet that the communication terminal receives at a second distance from the external device at least after receiving the first packet, wherein the second distance is different from the first distance;
deriving, based on the acquired first information and the acquired second information, an equation about a relationship between radio wave strengths and distances;
updating information related to the radio wave reception based on the equation; and
determining whether a predetermined condition is satisfied or not, based on the updated information and a radio wave strength of a packet received from an external device after completing the update of the information.

8. A method executed by a communication terminal, comprising:
acquiring first information indicating a first radio wave strength of a first packet that the communication terminal receives at a first distance from an external device;
acquiring second information indicating a second radio wave strength of a second packet that the communication terminal receives at a second distance from the external device at least after receiving the first packet, wherein the second distance is different from the first distance;
deriving a value based on the acquired first information and the acquired second information, wherein the derived value is used for predicting a third distance from the external device and the third distance is different from the first distance and the second distance; and
determining whether a predetermined condition is satisfied or not, based on the value and a radio wave strength of a packet received from an external device after completing the deriving of the value.

9. The method according to claim 8, wherein the method further comprising:
accepting a predetermined user's operation for performing adjustment related to radio wave reception,
wherein the first information is acquired based on the first radio wave strength of the first packet received by the communication terminal when a first user's instruction is received on a touch panel of the communication terminal at least after accepting the predetermined user's operation, and
wherein the second information is acquired based on the second radio wave strength of the second packet received by the communication terminal when a second user's instruction is received on the touch panel of the communication terminal.

10. The method according to claim 9,
wherein the first user's instruction is a user's selection for a first button displayed on the touch panel of the communication terminal, and
wherein the second user's instruction is a user's selection for a second button displayed on the touch panel of the communication terminal.

11. The method according to claim 8, wherein the method further comprising determining, based on the value and the radio wave strength of the packet received from the external device after completing the derive of the value, whether the predetermined condition indicates that the communication terminal and the external device that has transmitted the packets are close to each other within the third distance.

12. The method according to claim 8, wherein the method further comprising transmitting a login request to the external device in a case where it is determined that the predetermined condition is satisfied.

* * * * *